United States Patent
Okayama

(10) Patent No.: US 8,532,452 B2
(45) Date of Patent: Sep. 10, 2013

(54) OPTICAL DEVICE AND MACH-ZEHNDER INTERFEROMETER

(75) Inventor: Hideaki Okayama, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 157 days.

(21) Appl. No.: 12/591,846

(22) Filed: Dec. 2, 2009

(65) Prior Publication Data

US 2010/0178005 A1 Jul. 15, 2010

(30) Foreign Application Priority Data

Dec. 3, 2008 (JP) .................................. 2008-308235

(51) Int. Cl.
*G02B 6/10* (2006.01)
*G02B 6/26* (2006.01)
*G02B 6/36* (2006.01)
*G02B 6/42* (2006.01)

(52) U.S. Cl.
USPC ............. 385/50; 385/126; 385/129; 385/130; 385/131; 385/132

(58) Field of Classification Search
USPC .................... 385/50, 126, 129–132
See application file for complete search history.

(56) References Cited

U.S. PATENT DOCUMENTS

| | | | |
|---|---|---|---|
| 6,687,425 B2* | 2/2004 | Ridgway et al. | 385/14 |
| 7,221,826 B2* | 5/2007 | Hanashima et al. | 385/43 |
| 7,292,752 B2* | 11/2007 | Faccio et al. | 385/37 |
| 2009/0237375 A1* | 9/2009 | Khan et al. | 345/175 |

OTHER PUBLICATIONS

Koji Yamada, et al., "Silicon-wire-based ultrasmall lattice filters with wide freespectral ranges." Optics Letters, vol. 28, No. 18, pp. 1663-1664, Apr. 8, 2003.
Wim Bogaerts, et al., "Compact Wavelength-Selective Functions in Silicon-on Insulator Photonic Wires." IEEE Journal of selected topics in quantum electronics, vol. 12, No. 6, pp. 1394-1401, Nov. 2006.

* cited by examiner

*Primary Examiner* — Ryan Lepisto
*Assistant Examiner* — Jerry Blevins
(74) *Attorney, Agent, or Firm* — Rabin & Berdo, P.C.

(57) ABSTRACT

There is provided an optical device including a first optical waveguide of a directional coupler, a second optical waveguide connected to the first optical waveguide and which guides light, and a common cladding of the first and second optical waveguides, wherein: the common cladding of the first and second optical waveguides includes a first cladding and a second cladding, the second cladding being provided on the first cladding and having a higher refractive index than the first cladding; the first optical waveguide and the second optical waveguide are formed continuously on the first cladding with a constant width and a constant height and are integrated with each other, and a cross sectional shape of each of the first and second optical waveguides is a rectangular shape that is longest in a direction orthogonal to a surface of the first cladding.

5 Claims, 6 Drawing Sheets

OPTICAL DEVICE AND MACH-ZEHNDER INTERFEROMETER

CROSS-REFERENCE TO RELATED APPLICATION

This application claims priority under 35 USC 119 from Japanese Patent Application No. 2008-308235 filed on Dec. 3, 2008, the disclosure of which is incorporated by reference herein.

BACKGROUND

1. Technical Field

The present invention relates to an optical device and a Mach-Zehnder interferometer that are used in a field of optical communication.

2. Related Art

In recent years, technologies for using Si as an optical waveguide material have been actively studied for the purpose of size reduction and massive production.

As one of this type of studies, it has been tried to form an optical device including a directional coupler and an optical waveguide connected to the directional coupler using an optical waveguide made of Si. For example, the following two documents are referred to.

"Silicon-wire-based ultrasmall lattice filters with wide free spectral ranges", Koji Yamada, et. al., OPTICS LETTERS, Vol. 28, No. 18, pp 1663-1664

"Compact Wavelength-Selective Functions in Silicon-on-Insulator Photonic Wires", Wim Bogaerts, et. al., IEEE Journal of selected topics in quantum electronics, Vol. 12, No. 6, pp 1394-1401

However, optical devices that are disclosed in the two Documents have large polarization dependency and can utilize only one of a TE polarization and a TM polarization. As a result, utilization efficiency of light is not sufficient.

SUMMARY OF THE INVENTION

The present invention has been in view of the above-described problems. Therefore, a first object of the present invention is to provide an optical device that has a configuration where a directional coupler and optical waveguides are connected to each other, and does not depend on a polarization. Further, a second object of the present invention is to provide a Mach-Zehnder interferometer using an optical device having polarization independency.

In order to achieve the above-described objects, as a result of zealously examining the related technology, the present inventors have reached that, if horizontal section shapes of optical waveguides constituting a directional coupler and optical waveguides other than the optical waveguides constituting the directional coupler are configured as rectangular shapes where a dimension of the height is larger than a dimension of the width, polarization independency can be achieved, and have completed the present invention.

According to an aspect of the present invention, an optical device includes a first optical waveguide of a directional coupler and a second optical waveguide that is connected to the first optical waveguide and guides light. A common clad of the first and second optical waveguides includes a first clad and a second clad, which is provided on the first clad and has a higher refractive index than the first clad.

In this case, the first optical waveguide and the second optical waveguide are continuous to be integrated with each other and formed on the first clad with a constant width and a constant height, and horizontal section shapes of the first and second optical waveguides are configured as rectangular shapes that are long in a direction orthogonal to a surface of the first clad.

In one aspect of the optical device, a material of each of the first and second optical waveguides may be Si and a material of the first clad may be $SiO_2$.

In another aspect of the optical device, a material of the second clad may be $SiO_xN_y$ (however, $2 \geqq x \geqq 0$, $4/3 \geqq y \geqq 0$).

In further aspect of the optical element, a region that includes an end region of the second optical waveguide and the first and second dads extending to a surrounding portion of the end region may constitute a spot size converter, and the spot size converter may comprise an inside core that includes the end region provided with an oblique surface obliquely cut at a plane vertical to the surface of the first clad, and an outside core that includes the first and second dads, which include the inside core therein, have the lengths along a light propagation direction equal to or larger than the length of the end region along the light propagation direction, and have horizontal section shapes in a plane orthogonal to the light propagation direction configured as rectangular shapes having a larger area than a horizontal section of the inside core.

A Mach-Zehnder interferometer of the present invention may comprise the above-described optical device.

According to the present invention, since the above-described configuration is used, an optical device and a Mach-Zehnder interferometer that do not depend on a polarization can be obtained.

DETAILED DESCRIPTION

Figure 1A:
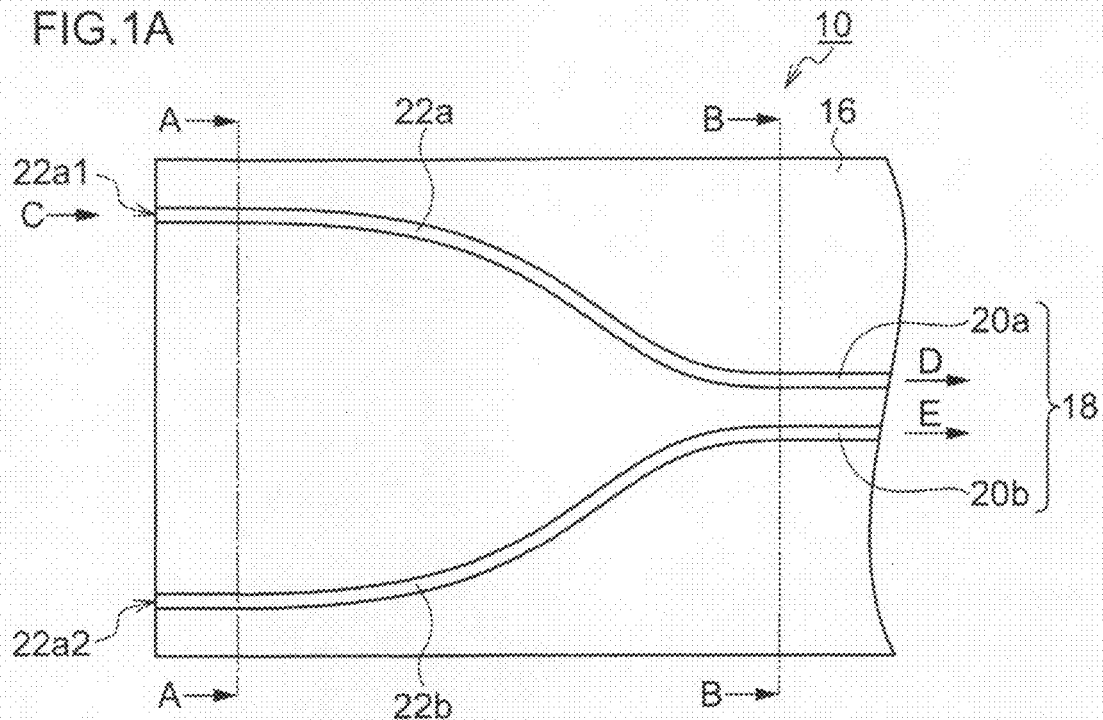
FIG. 1A is a plan view illustrating a schematic structure of an optical device according to a first embodiment.

Hereinafter, exemplary embodiments of the present invention will be described with reference to the accompanying drawings. It will be noted that each drawing only generally illustrates shapes, sizes and arrangement relationships of each component to the extent that this invention can be understood. Further, below, a preferred exemplary configuration of this invention will be described, but the material and numerical condition of each component are only preferred examples. Consequently, this invention should not be limited in any way to the exemplary embodiments below. Further, in each of the drawings, common components will be denoted by the same reference numerals, and sometimes description thereof will be omitted.

(First Embodiment)

Hereinafter, an optical device according to the first embodiment will be described with reference to the accompanying drawings.

(Structure)

Figure 1B:
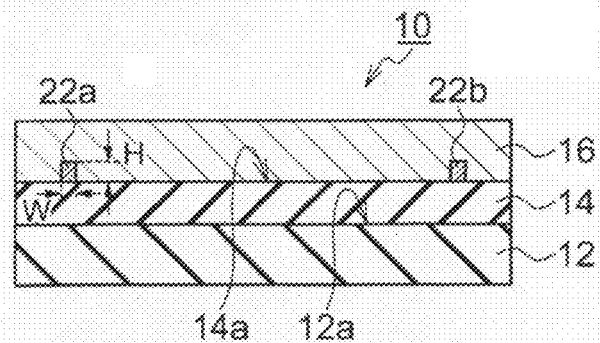
FIG. 1B is a cross-sectional view taken along the line A-A of FIG. 1A.
Figure 1C:
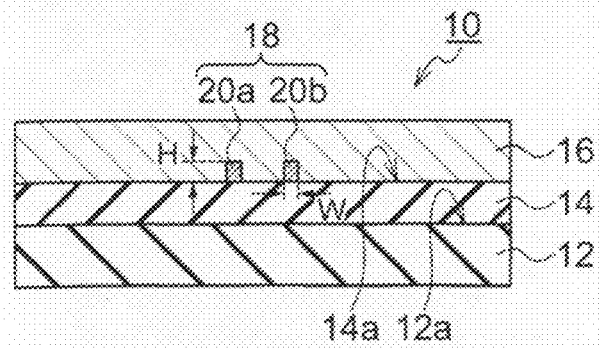
FIG. 1C is a cross-sectional view taken along the line B-B of FIG. 1A.

FIG. 1A is a plan view illustrating a schematic structure of an optical device 10. FIG. 1B is a cross-sectional view taken along the line A-A of FIG. 1A. FIG. 1C is a cross-sectional view taken along the line B-B of FIG. 1A.

In FIG. 1A, since first and second optical waveguides 20a, 20b, 22a, and 22b are covered with a second clad 16, the first and second optical waveguides cannot be directly viewed in actuality. However, in the drawings, in order to emphasize the first and second optical waveguides 20a, 20b, 22a, and 22b, the first and second optical waveguides are illustrated by solid lines.

Referring to FIGS. 1A to 1C, the optical device 10 includes a substrate 12, a first clad 14, a second clad 16, two first optical waveguides 20a and 20b that constitute a directional coupler 18, and second optical waveguides 22a and 22b that are connected to the first optical waveguides 20a and 20b, respectively.

The substrate 12 is a flat component. In the first embodiment, the substrate 12 is preferably formed of, for example, Si.

The first clad 14 is a flat component that is laminated on a first principal surface 12a of the substrate 12. In the first embodiment, the first clad 14 is preferably formed of $SiO_2$ having a refractive index of 1.46.

The length of the first cladding 14 measured vertically to the first principal surface 12a, that is, the thickness of the first cladding 14 is preferably about 1 μm or more. This dimension is used to prevent light loss, which is caused when light propagated through the first and second optical waveguides 20a, 20b, 22a, and 22b is radiated to the substrate 12.

The first optical waveguides 20a, 20b and the second optical waveguides 22a, 22b are optical waveguides that are formed on a surface 14a of the first clad 14. That is, the light is propagated through the first and second optical waveguides 20a, 20b, 22a, and 22b.

Specifically, the first optical waveguide 20a and the second optical waveguide 22a, and the first optical waveguide 20b an the second optical waveguide 22b, are connected to each other, respectively, and are continuous to be integrated with each other, and extend to the surface 14a of the first clad 14.

The first optical waveguides 20a and 20b linearly extend and are disposed parallel to each other at an interval with which the first optical waveguides are optically coupled with each other. As a result, the directional coupler 18 is configured by the two first optical waveguides 20a and 20b.

The second optical waveguides 22a and 22b are curved optical waveguides that have one end connected to the first optical waveguides 20a and 20b and the other ends exposed to sides of the optical device 10. The other ends function as light input/output ports 22a1 and 22b1. The second optical waveguides 22a and 22b have a function of guiding output light output from the directional coupler 18 or input light input to the directional coupler 18, through the light input/output ports 22a1 or 22b1.

In each of the first optical waveguides 20a and 20b, and the second optical waveguides 22a and 22b, its horizontal section shape is configured as a rectangular shape that is long in a direction orthogonal to the surface 14a of the first clad 14. In this case, the "horizontal section" indicates a cut surface of each of the first and second optical waveguides 20a, 20b, 22a, and 22b orthogonal to a light propagation direction.

In the first optical waveguides 20a and 20b, and the second optical waveguides 22a and 22b, the width W and the height H of the horizontal section are constant (refer to FIGS. 1B and 1C). Specifically, in the first optical waveguides 20a and 20b, and the second optical waveguides 22a and 22b, the horizontal section shapes that are orthogonal to the light propagation direction are equal to each other, and the dimensions of the lengths thereof in a direction that is orthogonal to the surface of the first clad 14, that is, the heights H are larger than the dimensions of the lengths in a direction that is parallel to the surface of the first clad 14, that is, the widths W.

In the example illustrated in the first embodiment, the width W of each of the first and second optical waveguides 20a, 20b, 22a, and 22b is preferably about 0.29 μm. In addition, the height H of each of the first and second optical waveguides 20a, 20b, 22a, and 22b is preferably about 0.30 μm. In a region of the directional coupler 18, the distance between the centers of the first optical waveguides 20a and 20b is preferably about 0.8 μm.

The width W and the height H of the horizontal section of each of the first and second optical waveguides 20a, 20b, 22a, and 22b preferably have the dimensions of 0.5 μm or less to propagate light in a single mode.

Each of the first and second optical waveguides 20a, 20b, 22a, and 22b is formed of a material that has a higher refractive index than the first clad 14 and the second clad 16, preferably, a material of Si having a refractive index of 3.5.

A structure 24 including the substrate 12 made of Si, the first clad 14 made of $SiO_2$, and the first and second optical waveguides 20a, 20b, 22a, and 22b made of Si, that is, the structure 24 (refer to FIG. 15B) excluding the second clad 16 from the optical device 10 is formed using an SOI (Silicon On Insulator) substrate that is known in a field of a semiconductor manufacturing technology.

That is, a Si layer of a top layer of the SOI substrate having a section structure of $Si/SiO_2/Si$ is formed using photolithography and etching technologies, the first and second optical waveguides 20a, 20b, 22a, and 22b are formed, and a $SiO_2$ layer of an intermediate layer is formed as the first clad 14.

The second clad 16 is a film object that is laminated on the surface 14a of the first clad 14 by coating the first and second optical waveguides 20a, 20b, 22a, and 22b. In the first embodiment, the second clad 16 is formed of $SiO_xN_y$ (however, $2 \geq x \geq 0$, $4/3 \geq y \geq 0$), which is a material whose refractive index is higher than that of $SiO_2$ constituting the first clad 14 and is lower than that of Si constituting the first and second optical waveguides 20a, 20b, 22a, and 22b.

In the first embodiment, the second clad 16 is preferably formed of $SiO_xN_y$ (however, $2 \geq x \geq 0$, $4/3 \geq y \geq 0$) whose refractive index is 1.6. The thickness of the second clad 16 is preferably about 2 μm.

The second clad 16 is formed such that the surface 14a of the first clad 14 is buried with the first and second optical waveguides 20a, 20b, 22a, and 22b.

The refractive index of the second cladding 16 may be set as an arbitrary appropriate value that is selected according to a design of the optical device 10, in a range satisfying a condition in which the refractive index is higher than that of the first cladding 14 and lower than those of the first and second optical waveguides 20a, 20b, 22a, and 22b. However, in order to achieve a function as a cladding with respect to the first and second optical waveguides 20a, 20b, 22a, and 22b to a practically allowable degree, the second cladding 16 preferably has a refractive index in a range of 1.46 to 1.8. The refractive index of the second cladding 16 can be adjusted by changing the values of a composition ratio of x and y of $SiO_xN_y$.

The thickness of the second clad 16 may be set as an arbitrary appropriate value that is selected according to a design of the optical device 10. However, in order to achieve a function as a clad with respect to the first and second optical waveguides 20a, 20b, 22a, and 22b to a practically allowable degree, the second clad 16 preferably has the thickness in a range of 1 to 3 μm.

The second clad 16 can be formed by laminating a film material from the side of the surface of the first clad 14 of the structure 24 using a known chemical vapor deposition (CVD) method.

(Operation)

Next, the operation of the optical device 10 will be simply described with reference to FIG. 1A.

For example, as illustrated by an arrow C in FIG. 1A, it is assumed that light is input from the optical input/output port 22a1 of the second optical waveguide 22a to the directional coupler 18. The input light is propagated through the second optical waveguide 22a to reach the directional coupler 18.

In the directional coupler 18, the first optical waveguides 20a and 20b are disposed parallel to each other at an interval where they can be optically coupled with each other. As a result, in the directional coupler 18, power of the light moves, from the first optical waveguide 20a connected to the second optical waveguide 22a, to the second optical waveguide 20b. As a result, as illustrated by arrows D and E in FIG. 1A, in the directional coupler 18, the light is output from the first optical waveguides 20a and 20b.

The movement degree of power of the light from the first optical waveguide 20a in the directional coupler 18 to the first optical waveguide 20b, that is, the strength of the light illustrated by an arrow E is determined by the length of the directional coupler 18 along the light propagation direction and the coupling strength of the light between the first optical waveguides 20a and 20b.

The optical device 10 according to the first embodiment is characterized in its polarization independency. That is, the optical device 10 shows the same optical characteristics with respect to both the TE wave and the TM wave, which will be described in detail in the following item (polarization independency).

(Polarization Independency)

Next, the case where the optical device 10 is operated without depending on a polarization will be described with reference to FIGS. 2A and 2B.

Figure 2A:
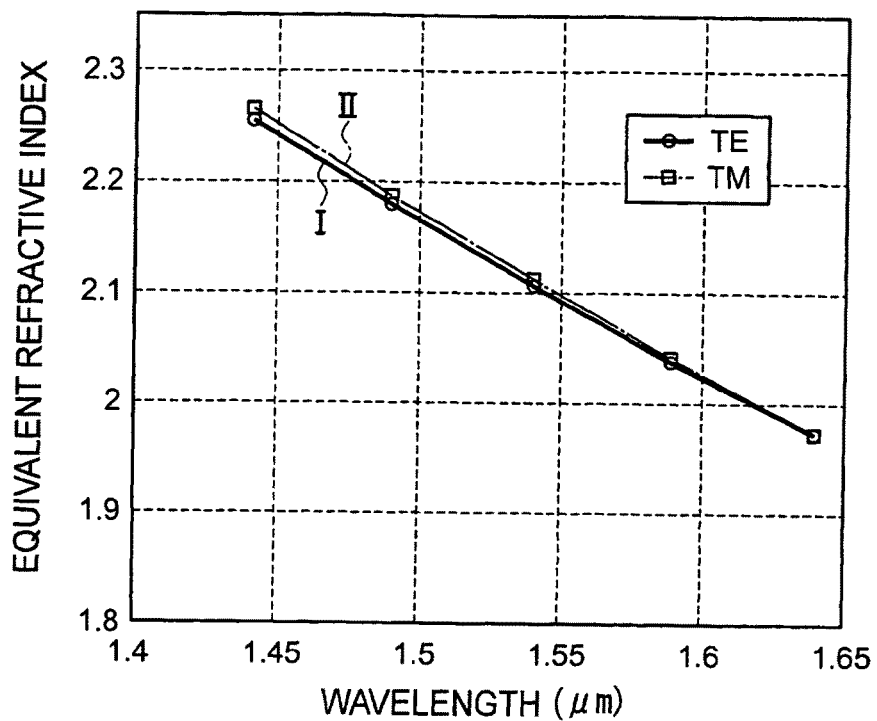
FIG. 2A is a characteristic graph illustrating polarization dependency in second optical waveguides.

FIG. 2A is a characteristic graph illustrating polarization dependency in the second optical waveguides 22a and 22b. In FIG. 2A, a vertical axis indicates effective refractive indexes (non-dimension) of the second optical waveguides 22a and 22b, and a horizontal axis indicates a wavelength (μm) of light that is propagated through the second optical waveguides 22a and 22b.

Figure 2B:
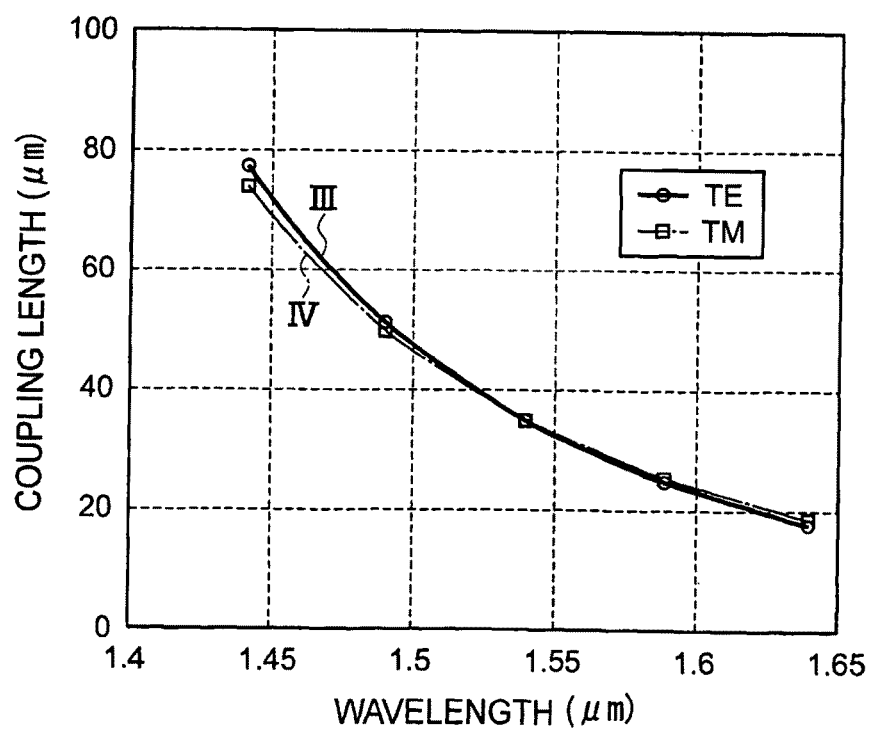
FIG. 2B is a characteristic graph illustrating polarization dependency in a directional coupler.

FIG. 2B is a characteristic graph illustrating polarization dependency in the directional coupler 18. In FIG. 2B, a vertical axis indicates the coupling length (μm) of the directional coupler 18 and a horizontal axis indicates a wavelength (μm) of light that is propagated through the directional coupler 18.

In the calculation of FIGS. 2A and 2B, a finite element method is used. Further, as numerical values that are needed for the calculation, numerical values that are illustrated in an item of (structure) are used.

First, the case where the polarization independency is achieved in the second optical waveguides 22a and 22b will be described with reference to FIG. 2A.

In FIG. 2A, two straight lines are illustrated. The straight line I corresponds to the TE wave and the straight line II corresponds to the TM wave.

In a range of wavelengths (1.45 to 1.65 μm) shown in FIG. 2A, the straight lines I and II are matched with each other. This indicates that the effective refractive indexes of the second optical waveguides 22a and 22b in the TE wave and the TM wave are equal to each other, in the range of the wavelengths. Accordingly, it can be seen from FIG. 2A that light propagation characteristics of the TE wave and the TM wave are equal to each other, in the regions of the second optical waveguides 22a and 22b, that is, polarization dependency does not exist.

Next, the case where the polarization independency is achieved in the directional coupler 18 will be described with reference to FIG. 2B.

In FIG. 2B, two curved lines are shown. The curved line III corresponds to the TE wave and the curved line IV corresponds to the TM wave.

In a range of wavelengths (1.45 to 1.65 μm) shown in FIG. 2B, the curved lines III and IV are matched with each other. This indicates that the coupling lengths of the TE wave and the TM wave are matched with each other, in the wavelength range. That is, this indicates that a movement degree of power of light per unit length along the light propagation direction in the directional coupler 18 is equal in the TE wave and the TM wave. Accordingly, it can be seen from FIG. 2B that light propagation characteristics of the TE wave and the TM wave are equal to each other, even in the region of the directional coupler 18, that is, polarization dependency does not exist.

In FIG. 2B, as an index that is used to evaluate the polarization dependency, the coupling length (vertical axis of FIG. 2B) of the directional coupler 18 is selected. This reason is that a value of a coupling coefficient or a value of the coupling length, which is calculated from the value of the coupling coefficient and used directly in a design, is an important design numerical value in the directional coupler 18. The design length of the directional coupler 18 is determined by the coupling length. In order to enable an element to operate without depending on a polarization, the polarization dependency of the coupling length needs to be minimized. The coupling length (coupling coefficient) is calculated from a difference of propagation constant numbers between a zero-order mode and a primary mode.

In this case, the "coupling length" means the length of the directional coupler 18 along the light propagation direction, which is needed when the power of the light input from the first optical waveguide 20a constituting the directional coupler 18 is completely moved to the other first optical waveguide 20b.

(Effect)

As described above, according to the optical device 10 in the first embodiment, (1) the horizontal section shapes of the first and second optical waveguides 20a, 20b, 22a, and 22b are configured as constant shapes where the dimension of the height H is larger than the dimension of the width W, and (2) the second clad 16 that has a higher refractive index than the first clad 14 is provided on the first clad 14. Therefore, an optical device in which the directional coupler 18 whose optical characteristic does not depend on a polarization and the second optical waveguides 22a and 22b are connected can be obtained.

(Design Condition)

Hereinafter, the design condition of the optical device 10 will be described.

1) With respect to a variation in the widths of the first and second optical waveguides 20a, 20b, 22a, and 22b The present inventors have investigated allowance values of the variation in the widths W of the first optical waveguides 20a and 20b that constitute the directional coupler 18. In general, in the directional coupler 18, the variation of the coupling length in the TE wave and the TM wave needs to be suppressed in a range of 10% or less in order to achieve the polarization independency. According to the evaluation of the present inventors, it has been approved that the variation in the widths W of the first optical waveguides 20a and 20b may be maintained in a range of ±10 nm or less to maintain the variation of the coupling length in a range of 10% or less. The variation (±10 nm) in the widths W is a value that can be sufficiently achieved by a current element manufacturing process technology.

The variation in the widths W of the second optical waveguides 22a and 22b is determined by an allowable variation in the effective refractive indexes of the second optical waveguides 22a and 22b. The allowable variation in the effective refractive indexes becomes different according to a use object of the optical device 10.

For example, when the optical device 10 is used as a component constituting an optical network unit (ONU) used in an optical subscriber system, the variation in the effective refractive indexes can be allowed up to about ±0.04. If the allowable variation in the widths W of the second optical waveguides 22a and 22b is estimated from the variation (±0.04) in the effective refractive indexes, the allowable variation becomes about ±30 nm. The variation (±30 nm) in the widths W is a value that can be sufficiently achieved by the current element manufacturing process technique.

2) With respect to refractive index dependency of the second clad 16

The refractive index dependency of the second clad 16 will be described with reference to FIGS. 3A and 3B.

Figure 3A:
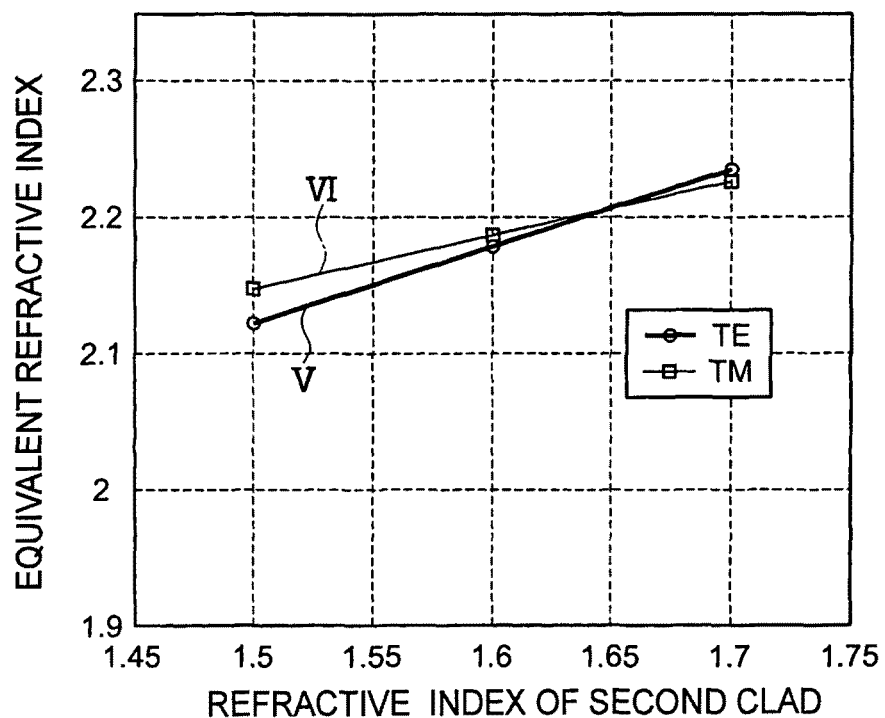
FIG. 3A is a characteristic graph illustrating refractive index dependency of a refractive index of a second clad in portions of second optical waveguides.

FIG. 3A is a characteristic graph illustrating refractive index dependency of a refractive index of the second clad 16 in portions of the second optical waveguides 22a and 22b. In FIG. 3A, a vertical axis indicates effective refractive indexes (non-dimension) of the second optical waveguides 22a and 22b and a horizontal axis indicates a refractive index (non-dimension) of the second clad 16.

Figure 3B:
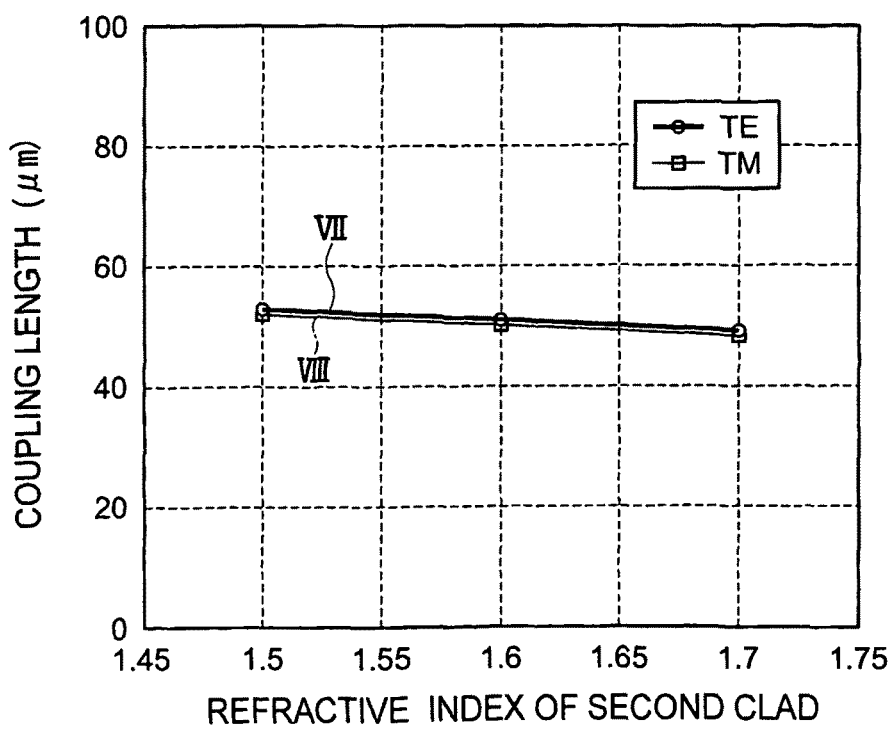
FIG. 3B is a characteristic graph illustrating refractive index dependency of a refractive index of a second clad in a portion of a directional coupler.

FIG. 3B is a characteristic graph illustrating refractive index dependency of a refractive index of the second clad 16 in a portion of the directional coupler 18 (first optical waveguides 20a and 20b). In FIG. 3B, a vertical axis indicates the coupling length (μm) of the directional coupler 18 and a horizontal axis indicates a refractive index (non-dimension) of the second clad 16.

In FIGS. 3A and 3B, it is assumed that the wavelength of light is 1.49 μm. In the calculation of FIGS. 3A and 3B, the numerical values that are described in the item of (structure) are used, and the calculation is made using the finite element method.

In FIG. 3A, two straight lines are shown. The straight line V corresponds to the TE wave and the straight line VI corresponds to the TM wave.

Referring to FIG. 3A, the straight lines V and VI are oblique upward to a right side. It can be seen from FIG. 3A that a variation is generated in the effective refractive indexes of the second optical waveguides 22a and 22b due to a difference of polarizations, when the refractive index of the second clad 16 varies.

However, from the straight lines V and VI being matched with each other at a point of about 1.65 of the horizontal axis (refractive index of the second clad 16), it can be seen that the variation in the effective refractive indexes can be compensated for by selecting the refractive index of the second clad 16.

In FIG. 3B, two straight lines are shown. The straight line VII corresponds to the TE wave and the straight line VIII corresponds to the TM wave.

Referring to FIG. 3B, it can be seen that the straight lines VII and VIII are almost horizontal to each other. That is, in a range of refractive indexes (1.5 to 1.7) of the second clad 16 to be evaluated, in the portion of the directional coupler 18, the coupling length rarely varies with respect to the refractive index of the second clad 16. This indicates that polarization dependency with respect to the refractive index of the second clad 16 is low, in regards to light having a wavelength of 1.49 μm.

3) With respect to a material of the second clad 16

In the first embodiment, the case where $SiO_xN_y$ (however, $2 \geq x \geq 0$, $4/3 \geq y \geq 0$) is used as the material of the second clad 16 has been described. However, the material for forming the second clad 16 is not limited to $SiO_xN_y$ (however, $2 \geq x \geq 0$, $4/3 \geq y \geq 0$), as long as the material for forming the second clad 16 is a material that has a higher refractive index than that of the first clad 14 and a lower refractive index than those of the first and second optical waveguides 20a, 20b, 22a, and 22b, and can achieve polarization independency in a state where the dimensions of the horizontal sections of the first and second optical waveguides 20a, 20b, 22a, and 22b are equally maintained. For example, $SiO_2$ that includes $Ta_2O_5$ and $TiO_2$ may be used.

(Second Embodiment)

Next, an optical device according to the second embodiment will be described with reference to FIGS. 4A to 5H.

Figure 4A:
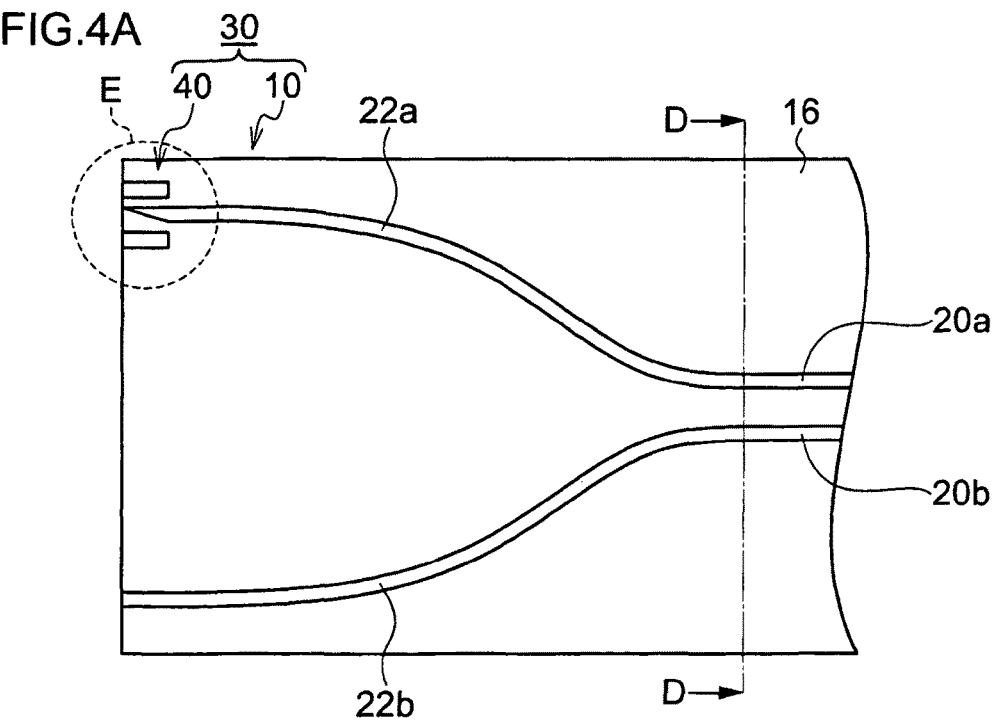
FIG. 4A is a plan view illustrating a schematic structure of an optical device according to a second embodiment.
Figure 4B:
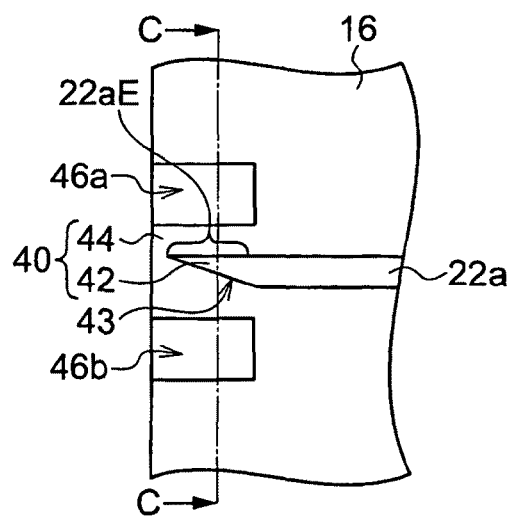
FIG. 4B is an enlarged plan view of a portion of a region E of FIG. 4A, that is, a portion of a spot size converter.
Figure 4C:
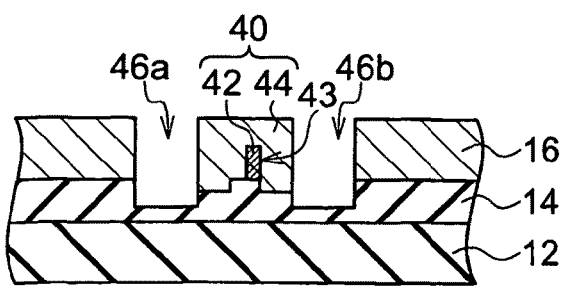
FIG. 4C is a cross-sectional view taken along the line C-C of FIG. 4B.

FIG. 4A is a plan view illustrating a schematic structure of an optical device 30. FIG. 4B is an enlarged plan view of a portion of a region E of FIG. 4A, that is, a portion of a spot size converter 40. FIG. 4C is a cross-sectional view taken along the line C-C of FIG. 4B.

In FIGS. 4A and 4B, since the first and second optical waveguides 20a, 20b, 22a, and 22b are covered with the second clad 16, the first and second optical waveguides cannot be directly viewed in actuality. However, in the drawings, in order to emphasize the first and second optical waveguides 20a, 20b, 22a, and 22b, the first and second optical waveguides are illustrated by solid lines.

The optical device 30 according to the second embodiment has the same configuration as the optical device 10 according to the first embodiment, except that the spot size converter 40 is added. Accordingly, in FIGS. 4A to 4C, the same components as those of FIG. 1 are denoted by the same reference numerals and the repetitive description is omitted.

The optical device 30 includes the optical device 10 and the spot size converter 40. As described above, since the optical device 10 is the same as the optical device according to the first embodiment, the description thereof is omitted.

First, the general configuration of the spot size converter will be described. The spot size converter is an element that performs optical connection between two kinds of optical devices where core diameters of optical waveguides propagating light are different from each other. In the second embodiment, the spot size converter performs optical connection between Si thin line waveguides, such as the second optical waveguides 22a and 22b, which have small core diameters, and an optical device, such as an optical fiber provided outside the optical device 30, which has a large core diameter.

Referring to FIG. 4A, the spot size converter 40 is formed in a region E that includes an end region 22aE of the second optical waveguide 22a and the first and second dads 14 and 16 extending to a surrounding portion of the end region 22aE.

(Structure)

Hereinafter, the structure of the spot size converter 40 will be described with reference to FIGS. 4B and 4C.

The spot size converter 40 includes an inside core 42 and an outside core 44.

The inside core 42 is a component that is obtained by processing the end region 22aE of the second optical waveguide 22a in a wedge shape. That is, the inside core 42 includes an oblique surface 43 that is obtained by obliquely cutting the end region 22aE of the second optical waveguide 22a at a plane vertical to the surface 14a of the first clad 14. As a result, the inside core 42 is formed in a tapered shape in which the inside core 42 is gradually tapered toward the outside of the optical device 30, until a sectional area becomes zero.

In this case, the length of the end region 22aE along the light propagation direction, that is, the length of a region where the oblique surface 43 is formed along the light propagation direction is determined in consideration of light propagation efficiency from the inside core 42 to the outside core 44. In regards to the material and dimension of the optical device according to the second embodiment, the length of the end region 22aE is preferably about several tens of micrometers.

The outside core 44 includes the first and second dads 14 and 16 that are processed in a rectangular solid shape to include the inside core 42 therein. The length of the outside core 44 along the light propagation direction is equal to or larger than the length of the end region 22aE along the light propagation direction. The horizontal section shape of the outside core 44 in a plane that is orthogonal to the light propagation direction is configured as a rectangular shape having a larger area than the horizontal section of the inside core 42, specifically, a square shape in the second embodiment. The dimension of the horizontal section of the outside core 44 is equal to the dimension of the core diameter of an external optical device (for example, optical fiber) to be optically coupled with the spot size converter 30.

The inside core 42 extends near a central portion of the section of the outside core 44 having a square shape. As such, the inside core 42 is disposed near the central portion of the outside core 44 to improve light propagation efficiency from the inside core 42 to the outside core 44.

The outside core 44 is formed by etching and removing the entire portion of the second clad 16 extending to a surrounding portion of a region to become the outside core 44 and a portion of the first clad 14. That is, at both sides of the outside core 44 in a widthwise direction (direction that is parallel to the first principal surface 12a of the substrate 12 and orthogonal to the light propagation direction), recesses 46a and 46b are formed.

(Operation)

Next, the operation of the spot size converter 40 will be simply descried with reference to FIGS. 4B and 4C.

In this case, it is assumed that light is propagated from the first optical waveguide 20a of the directional coupler 18 through the second optical waveguide 22a to the end region 22aE.

The light that has reached the end region 22aE is gradually propagated from the inside core 42 to the outside core 44. If the sectional area of the inside core 42 decreases, the effective refractive index of the inside core 42 also gradually decreases toward a front end.

As a result, a confinement capability of light of the inside core 42 gradually becomes weak as the light is propagated through the end region 22aE toward the front end. Therefore, the light is gradually propagated from the end region 22aE to the outside core 44. The light is completely propagated to the outside core 44 at the front end where the sectional area of the inside core 42 becomes zero.

In this way, the light that has been propagated to the outside core 44 is optically coupled with an external optical device (not illustrated), such as an optical fiber.

The spot size converter 40 is equally operated with respect to polarizations of both the TE wave and the TM wave. The light propagation efficiency from the inside core 42 to the outside core 44 is almost equal in the TE wave and the TM wave.

This reason is as follows. That is, the TE wave that is propagated through the inside core 42 is gradually propagated to the outside core 44, due to a decrease in the effective refractive index generated when the width of the inside core 42 becomes narrowed.

Meanwhile, the TM wave is not propagated to the outside core 44 that has a significantly low effective refractive index, in the course of being propagated through the inside core 42, because the effective refractive index is high in the longitudinal section shape. However, since the sectional area of the inside core 42 becomes almost zero at the front end, most of the TM wave is propagated to the outside core 44 in the vicinity of the front end.

As a result, the polarizations of both the TE wave and the TM wave can be efficiently propagated from the inside core 42 to the outside core 44, using the spot size converter 40.

(Manufacturing Method)

Next, a method of manufacturing the spot size converter 40 will be described with reference to FIGS. 5A to 5H. In particular, the case where the spot size converter 40 and the optical device 30 can be manufactured using common manufacturing processes will be described.

FIGS. 5A to 5D are cross-sectional views taken along the line D-D of FIG. 4A, which are process views sequentially illustrating main process steps of manufacturing processes of the optical device 30. FIGS. 5E to 5H are cross-sectional views taken along the line C-C of FIG. 4B, which are process views sequentially illustrating main process steps of manufacturing processes of the spot size converter 40.

FIGS. 5A and 5E, FIGS. 5B and 5F, FIGS. 5C and 5G, and FIGS. 5D and 5H illustrate the same process steps, respectively.

Figure 5A:
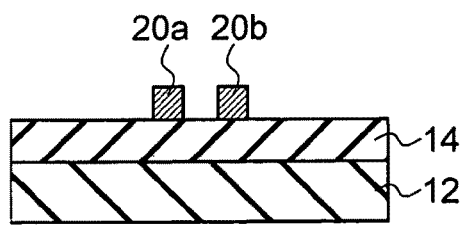
FIGS. 5A to 5D are cross-sectional views taken along the line D-D of FIG. 4A, which are process views sequentially illustrating main process steps of manufacturing processes of an optical device.
Figure 5E:
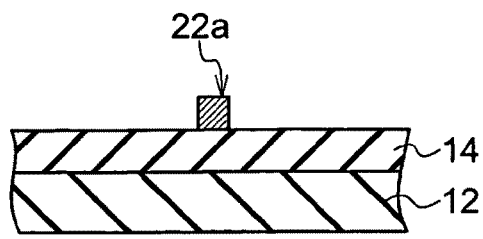
FIGS. 5E to 5H are cross-sectional views taken along the line C-C of FIG. 4B, which are process views sequentially illustrating main process steps of manufacturing processes of a spot size converter.

(First Process: FIGS. 5A and 5E)

First, a merchandise SOI substrate that has a laminated structure of Si/SiO$_2$/Si is prepared, and a Si layer of a top layer is patterned using photolithographic and etching technologies known in the related art.

As a result, as illustrated in FIG. 5A, the first optical waveguides 20a and 20b are formed on a SiO$_2$ layer (first clad 14) that corresponds to an intermediate layer of the SOI substrate. Similarly, as illustrated in FIG. 5E, the second optical waveguide 22a is formed on the SiO$_2$ layer (first clad 14) that corresponds to the middle layer of the SOI substrate.

Figure 5B:
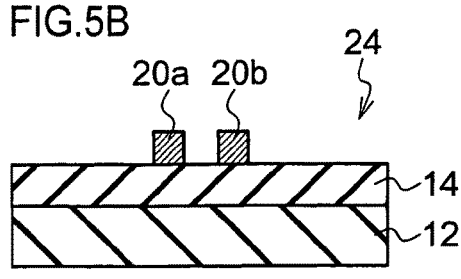
Figure 5F:
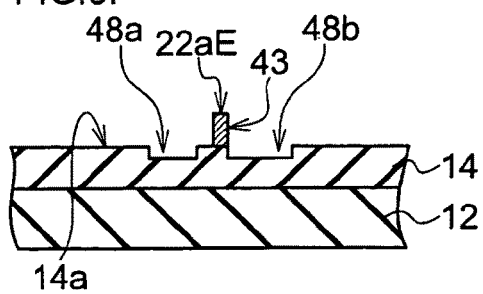

(Second Process: FIGS. 5B and 5F)

Next, as illustrated in FIG. 5F, the oblique surface 43 is formed by obliquely etching the second optical waveguide 22a at a plane vertical to the surface 14a of the first clad 14, in the region that constitutes the spot size converter 40.

That is, the entire surface of the first clad 14 other than the end region 22aE of the second optical waveguide 22a including the oblique surface 43 and precursory recesses 48a and 48b becoming recesses 46a and 46b (refer to FIG. 5H) is coated with a photoresist that functions as an etching protective film (not illustrated).

Then, known etching is performed and the photoresist is removed using a known method. As a result, as illustrated in FIG. 5F, the oblique surface 43 is formed in the end region 22aE of the second optical waveguide 22a, and the end region 22aE is processed in a tapered shape. At the same time, the precursory recesses 48a and 48b that change to the recesses 46a and 46b during the following processes are formed at both sides of the end region 22aE in a widthwise direction.

Meanwhile, as illustrated in FIG. 5B, since the first optical waveguides 20a and 20b are coated with the photoresist and protected during the processes, the first optical waveguides do not change.

Figure 5C:
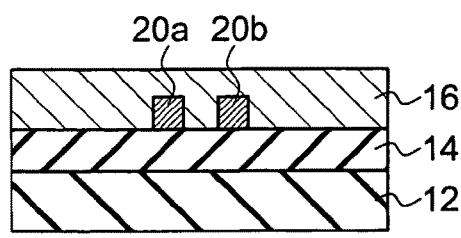
Figure 5G:
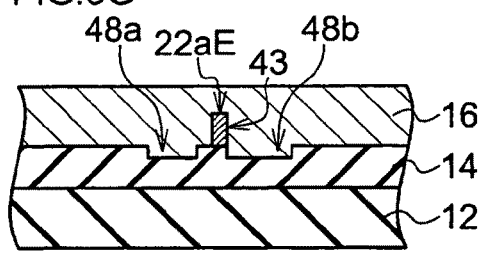

(Third Process: FIGS. 5c and 5g)

Next, as illustrated in FIGS. 5C and 5G; in a structure that is obtained by the second process, an SiO$_x$N$_y$ film (however, $2 \geq x \geq 0$, $4/3 \geq y \geq 0$) that functions as the second clad 16 is formed on the entire surface of the first clad 14 using a known CVD method.

Figure 5D:
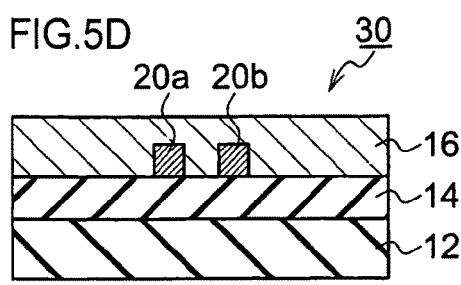
Figure 5H:
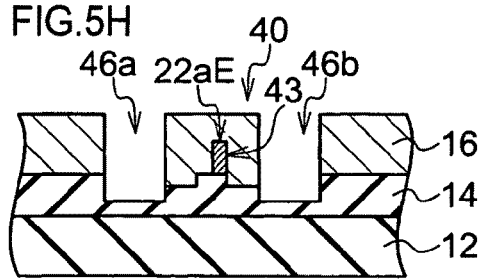

(Fourth Process: FIGS. 5d and 5h)

Next, as illustrated in FIG. 5H, in the region that constitutes the spot size converter 40, the second clad 16 is removed by etching and the recesses 46a and 46b are formed.

That is, the entire surface of the second clad 16 other than the region where the precursory recesses 48a and 48b are formed is coated with the photoresist that functions as the etching protective film (not illustrated).

Then, the known etching is performed and the photoresist is removed using the known method. As a result, as illustrated in FIG. 5H, the spot size converter 40 is formed.

At the same time, as illustrated in FIG. 5D, the optical device 30 where the first optical waveguides 20a and 20b are coated with the first and second clads 14 and 16 is formed.

(Effect)

According to the optical device 30 in the second embodiment, the same effect as that of the optical device 10 according to the first embodiment can be achieved. The optical device 30 can optically couple the light, which is input to or output from the optical device 10, with an external optical device in a polarization independent state.

(Third Embodiment)

Next, an optical device according to the third embodiment will be described with reference to FIGS. 6A and 6B.

(Structure)

Figure 6A:
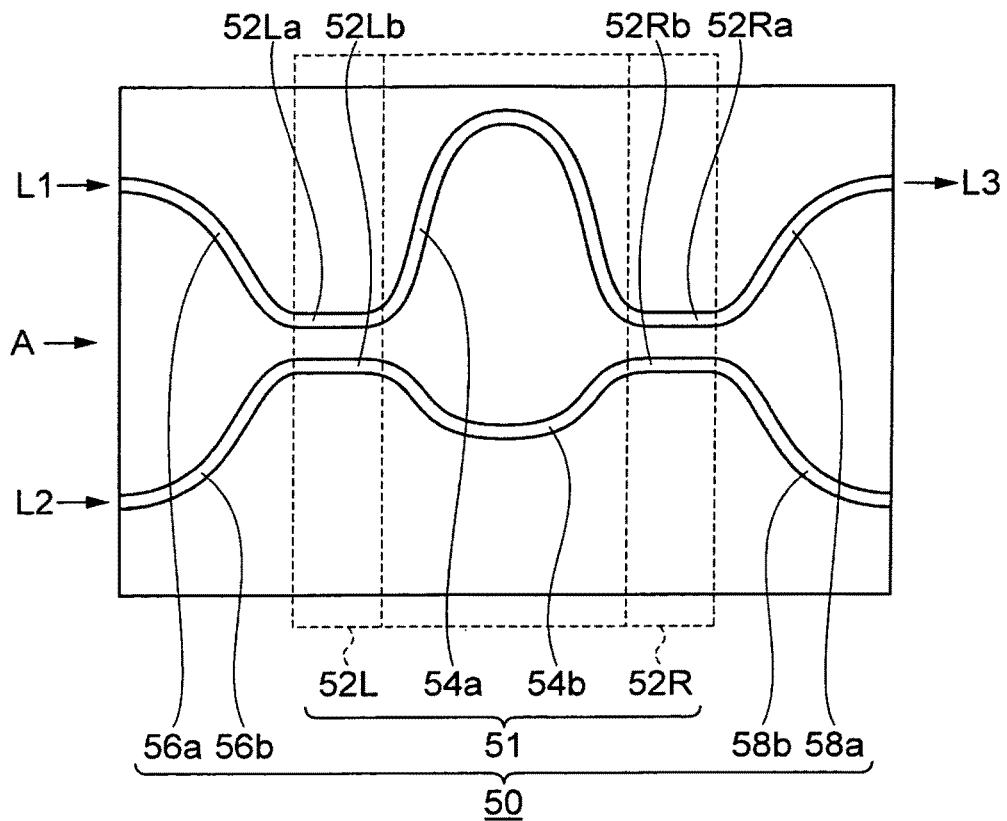
FIG. 6A is a plan view illustrating a schematic structure of an optical device according to a third embodiment.
Figure 6B:
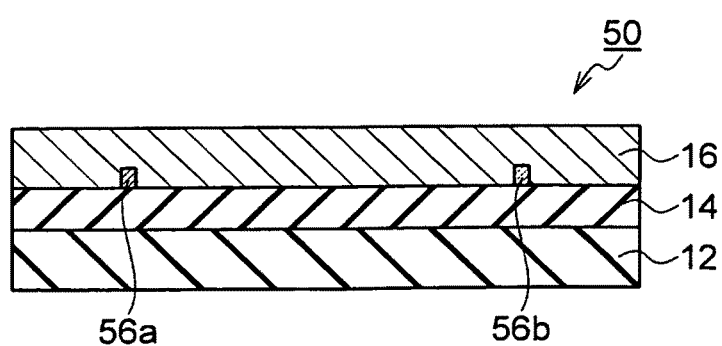
FIG. 6B is a side view of an optical device when viewed from a direction of an arrow A illustrated in FIG. 6A.

FIG. 6A is a plan view illustrating a schematic structure of an optical device 50. FIG. 6B is a side view of the optical device 50 when viewed from a direction of an arrow A illustrated in FIG. 6A.

The optical device 50 according to the third embodiment corresponds to an application of the optical device 10 described in the first embodiment. The same components as those of FIG. 1 are denoted by the same reference numerals and the repetitive description is omitted.

In FIG. 6A, since a Mach-Zehnder interferometer 51, optical waveguides 56a and 56b for input, and optical waveguides 58a and 58b for output are covered with the second clad 16, they cannot be directly viewed in actuality. However, in the drawings, in order to emphasize the Mach-Zehnder interferometer 51, the optical waveguides 56a and 56b for input, and the optical waveguides 58a and 58b for output, they are illustrated by solid lines.

Referring to FIG. 6A, the optical device 50 is configured as if the two optical devices 10 (refer to FIG. 1) have been coupled with each other.

That is, the optical device 50 includes the Mach-Zehnder interferometer 51, the optical waveguides 56a and 56b for input, and the optical waveguides 58a and 58b for output. The Mach-Zehnder interferometer 51 is configured by two directional couplers 52L and 52R and two second optical waveguides 54a and 54b connecting the directional couplers 52L and 52R.

As already described in the first embodiment, the directional coupler 52L includes two parallel first optical waveguides 52La and 52Lb that linearly extend at an interval where they can be optically coupled with each other.

Similarly, as already described in the first embodiment, the directional coupler 52R includes two parallel first optical waveguides 52Ra and 52Rb that linearly extend at an interval where they can be optically coupled with each other.

The second optical waveguides 54a and 54b have different lengths of optical paths. In the third embodiment, the length of the optical path of the second optical waveguide 54a is larger than the length of the optical path of the second optical waveguide 54b.

The second optical waveguide 54a optically couples the first optical waveguide 52La of the directional coupler 52L and the first optical waveguide 52Ra of the directional coupler 52R.

Similarly, the second optical waveguide 54b optically couples the first optical waveguide 52Lb of the directional coupler 52L and the first optical waveguide 52Rb of the directional coupler 52R.

That is, the Mach-Zehnder interferometer 51 has a structure where the first optical waveguides 52La, 52Ra, 52Lb, and 52Rb constituting the directional couplers 52L and 52R are connected to both ends of the common second optical waveguides 54a and 54b.

The optical waveguides 56a and 56b for, input have one end that is exposed to one side of the optical device 50 and the other ends that are optically coupled with the first optical waveguides 52La and 52Lb of the directional coupler 52L, respectively. The optical waveguides 56a and 56b for input have a function of propagating the light, which is input from the outside, to the Mach-Zehnder interferometer 51.

The optical waveguides 58a and 58b for output have one ends that are exposed to the other side of the optical device 50 and the other ends that are optically coupled with the first optical waveguides 52Ra and 52Rb of the directional coupler 52R, respectively. The optical waveguides 58a and 58b for output have a function of propagating the light, which is output from the Mach-Zehnder interferometer 51, to the outside.

(Operation)

Next, the operation of when the optical device 50 is applied to an optical network unit (ONU) used in an optical subscriber system will be described with reference to FIG. 6A.

In this case, a difference of the lengths of the optical paths of the second optical waveguides 54a and 54b is defined as $\Delta L$. It is assumed that first light L1 having a wavelength $\lambda 1$ and second light L2 having a wavelength $\lambda 2$ are simultaneously input to the Mach-Zehnder interferometer 51 from the optical waveguide 56a for input and the optical waveguide 56b for input, respectively.

In general, in the Mach-Zehnder interferometer, if the difference ΔL of the lengths of the optical paths of the second optical waveguides 54a and 54b is appropriately set to the wavelength of the input light, the input light can be output in any one of a bar state and a cross state.

It is known that a relationship between the difference ΔL of the lengths of the optical paths of the second optical waveguides 54a and 54b and the wavelength λ of the light determine whether the light L is output in the bar state or output in the cross state. That is, when the following Equation 1 is realized, the light L is output in the cross state. When the following Equation 2 is realized, the light L is output in the bar state.

$$2\pi n \Delta L/\lambda = 2m\pi \qquad \text{[Equation 1]}$$

$$2\pi n \Delta L/\lambda = (2m+1)\pi \qquad \text{[Equation 2]}$$

Here, n is the refractive indexes of the second optical waveguides 54a and 54b, and m is a natural number.

That is, as illustrated in FIG. 6A, the difference ΔL of the lengths of the optical paths of the second optical waveguides 54a and 54b is set, such that the first light L1 is output in the bar state and the second light L2 is output in the cross state. Thereby, an optical multiplexing/demultiplexing element 50 can perform multiplexing/demultiplexing on the first light L1 and the second light L2.

That is, the first light L1 and the second light L2 that are input from the optical waveguides 56a and 56b for input are multiplexed in the Mach-Zehnder interferometer 51, and the multiplexed light is output as multiplexed light L3 from the optical waveguide 58a for output.

(Effect)

The optical device 50 according to the third embodiment includes the Mach-Zehnder interferometer 51 that does not depend on a polarization. As a result, the first light L1 and the second light L2 that have the different wavelengths can be multiplexed or demultiplexed without depending on a polarization.

What is claimed is:

1. An optical device comprising a pair of first optical waveguides of a directional coupler, the first optical waveguides being disposed so as to be apart from each other in a horizontal direction, a pair of second optical waveguides connected to the first optical waveguides and guiding light, the second optical waveguides being disposed so as to be apart from each other in the horizontal direction, and a common cladding of the first and second optical waveguides, wherein:

the common cladding of the first and second optical waveguides includes a first cladding and a second cladding, the second cladding being provided on the first cladding and having a refractive index that is in a range of 1.46 to 1.8, and that is higher than that of the first cladding and lower than those of the first and second optical waveguides;

the first optical waveguides and the second optical waveguides are formed continuously on the first cladding with a constant width and a constant height and are integrated with each other in a light propagation direction, and the constant height is greater than the constant width such that the constant height is about 0.30 μm and the constant width is about 0.29 μm;

a cross sectional shape of each of the first and second optical waveguides is a rectangular shape that is longest in a direction orthogonal to a surface of the first cladding; and in a cross-section of both the first optical waveguides and the second optical waveguides, a rear surface thereof is covered with the first cladding, and a side surface and a top surface thereof are covered with the second cladding.

2. The optical device according to claim 1, wherein a material of each of the first and second optical waveguides is Si and a material of the first cladding is $SiO_2$.

3. The optical device according to claim 1, wherein a material of the second cladding is $SiO_xN_y$, and $2 \geq x \geq 0$, $4/3 \geq y \geq 0$.

4. The optical device according to claim 1, wherein:

a region that includes an end region of the second optical waveguides and the first and second claddings extending to an area surrounding the end region, constitutes a spot size converter; and the spot size converter comprises:

an inner core that includes the end region which is formed with an oblique surface obliquely cut along a plane orthogonal with respect to a surface of the first cladding, and an outer core which includes the inner core therein and which includes the first and second claddings, the first and second claddings having lengths along the light propagation direction, the lengths equal to or greater than a length of the end region along the light propagation direction, and the first and second claddings having a cross sectional shape in a plane orthogonal to the light propagation direction which is a rectangular shape having a greater area than a cross section of the inner core.

5. A Mach-Zehnder interferometer comprising the optical device according to claim 1.

* * * * *